(12) United States Patent
Cutler et al.

(10) Patent No.: US 8,219,387 B2
(45) Date of Patent: Jul. 10, 2012

(54) IDENTIFYING FAR-END SOUND

(75) Inventors: Ross Cutler, Redmond, WA (US); Xinding Sun, Sammamish, WA (US); Senthil Velayutham, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/953,764

(22) Filed: Dec. 10, 2007

(65) Prior Publication Data
US 2009/0150149 A1 Jun. 11, 2009

(51) Int. Cl.
G06F 15/00 (2006.01)
G10L 11/00 (2006.01)
G10L 19/12 (2006.01)
G10L 21/02 (2006.01)
G10L 17/00 (2006.01)

(52) U.S. Cl. ......... 704/200; 704/226; 704/223; 704/246
(58) Field of Classification Search ............. 704/200, 704/226, 223, 246
See application file for complete search history.

(56) References Cited

U.S. PATENT DOCUMENTS

| | | | |
|---|---|---|---|
| 3,118,340 A | 1/1964 | Iwerks et al. | |
| 4,611,342 A * | 9/1986 | Miller et al. | 704/225 |
| 4,658,425 A * | 4/1987 | Julstrom | 381/81 |
| 5,271,057 A | 12/1993 | Addeo et al. | |
| 5,307,405 A * | 4/1994 | Sih | 379/406.08 |
| 5,561,668 A | 10/1996 | Genter | |
| 5,587,998 A | 12/1996 | Velardo, Jr. et al. | |
| 5,796,819 A | 8/1998 | Romesburg | |
| 6,157,403 A * | 12/2000 | Nagata | 348/171 |
| 6,208,963 B1 * | 3/2001 | Martinez et al. | 704/232 |
| 6,377,918 B1 * | 4/2002 | Series | 704/226 |
| 6,377,919 B1 * | 4/2002 | Burnett et al. | 704/231 |
| 6,442,272 B1 | 8/2002 | Osovets | |
| 6,611,601 B2 | 8/2003 | Terada et al. | |
| 6,842,516 B1 | 1/2005 | Armbruter | |
| 6,868,157 B1 | 3/2005 | Okuda | |
| 6,922,403 B1 | 7/2005 | Yoo | |
| 6,968,064 B1 | 11/2005 | Ning | |
| 6,970,796 B2 | 11/2005 | Tashev | |
| 6,987,856 B1 | 1/2006 | Feng et al. | |
| 7,010,119 B2 | 3/2006 | Marton et al. | |
| 7,020,337 B2 | 3/2006 | Viola et al. | |

(Continued)

FOREIGN PATENT DOCUMENTS

JP 08-125835 5/1996

OTHER PUBLICATIONS

"Acoustic Echo Canceller Demo using the Block Frequency Domain Adaptive Filter Algorithm", http://www.dspalgorithms.com/bfdafaec/bfdafaec11.html.

(Continued)

*Primary Examiner* — Eric Yen

(57) ABSTRACT

Frames containing audio data may be received, the audio data having been derived from a microphone array, at least some of the frames containing residual acoustic echo after having acoustic echo partially removed therefrom. Probability distribution functions are determined from the frames of audio data. A probability distribution function comprises likelihoods that respective directions are directions of sources of sounds. An active speaker may be identified in frames of video data based on the video data and based on audio information derived from the audio data, where use of the audio information as a basis for identifying the active speaker is controlled by determining whether the probability distribution functions indicate that corresponding audio data includes residual acoustic echo.

17 Claims, 8 Drawing Sheets

U.S. PATENT DOCUMENTS

| | | | |
|---|---|---|---|
| 7,031,499 B2 | 4/2006 | Viola et al. | |
| 7,039,199 B2 | 5/2006 | Rui | |
| 7,099,510 B2 | 8/2006 | Jones et al. | |
| 7,099,821 B2* | 8/2006 | Visser et al. | 704/226 |
| 7,127,071 B2 | 10/2006 | Rui et al. | |
| 7,197,186 B2 | 3/2007 | Jones et al. | |
| 7,212,651 B2 | 5/2007 | Viola et al. | |
| 7,242,763 B2 | 7/2007 | Etter | |
| 7,454,010 B1* | 11/2008 | Ebenezer | 379/392.01 |
| 2002/0172350 A1 | 11/2002 | Edwards et al. | |
| 2002/0184012 A1* | 12/2002 | Burnett et al. | 704/223 |
| 2003/0187632 A1* | 10/2003 | Menich | 704/1 |
| 2004/0001137 A1 | 1/2004 | Cutler et al. | |
| 2004/0101038 A1 | 5/2004 | Etter | |
| 2004/0120510 A1 | 6/2004 | LeBlanc | |
| 2004/0170164 A1 | 9/2004 | LeBlanc et al. | |
| 2004/0228215 A1 | 11/2004 | Ichikawa et al. | |
| 2004/0228474 A1 | 11/2004 | Taniguchi et al. | |
| 2004/0252845 A1 | 12/2004 | Tashev | |
| 2004/0263636 A1 | 12/2004 | Cutler et al. | |
| 2005/0157866 A1 | 7/2005 | Marton | |
| 2005/0278171 A1* | 12/2005 | Suppappola et al. | 704/227 |
| 2006/0147063 A1 | 7/2006 | Chen | |
| 2006/0233353 A1 | 10/2006 | Beaucoup et al. | |
| 2006/0239443 A1 | 10/2006 | Oxford et al. | |
| 2007/0036343 A1 | 2/2007 | Sudo et al. | |
| 2007/0136053 A1* | 6/2007 | Ebenezer | 704/208 |
| 2007/0263849 A1 | 11/2007 | Stokes et al. | |
| 2008/0107281 A1 | 5/2008 | Togami et al. | |
| 2008/0273683 A1 | 11/2008 | Cohen et al. | |

OTHER PUBLICATIONS

Rick, et al., "Integration of Automatic Microphone Selection with Acoustic Echo Cancellation", Date: Oct. 1996, http://www.aes.org/e-lib/browse.cfm?elib=10220.

Wang, et al., "Voice Source Localization for Automatic Camera Pointing System in Videoconferencing", Applications of Signal Processing to Audio and Acoustics, Date: Oct. 1997, Issue: 19-22, pp. 4.

Fredrick Lindstrom, et al., A Hybrid Acoustic Echo Canceller and Suppressor, Science Direct, Jul. 6, 2006, pp. 739-749.

Miket DSP Solutions, Acoustic Echo Canceller Data Sheet, pp. 1-49.

Saeed Vaseghi, Echo Cancellation, pp. 1-20.

Fredrick Lindstrom, Improving the Performance of a Low-Complexity Doubletalk Detector by a Subband Approach, pp. 1-5, Sweden.

Koen Eneman, et al., Real-Time Implementation of an Acoustic Echo Canceller, May 1998, pp. 1-7, Italy.

* cited by examiner

IDENTIFYING FAR-END SOUND

BACKGROUND

Videoconferencing systems are used to allow real-time visual and voice communication between participants. For purpose of discussion, the different ends of a videoconference are referred to as near-end and far-end. The near-end is a local frame of reference, and the far-end is a remote frame of reference. Typically the near-end and the far-end have respective video and audio equipment through which near-end and far-end participants communicate. Some videoconferencing devices are able to automatically detect who is actively speaking, locally, by analyzing captured video and audio data. Detecting the active speaker can enable a number of features such as automatic panning and zooming (either physically or virtually), displaying information to help a viewer identify the active speaker, transcribing information about who said what during a videoconference, and others.

While an active speaker can be detected using only analysis of video data, active speaker detection can be improved by also using audio data. A videoconferencing device may be provided with a microphone array, and time-delay analysis can be used to calculate likely directions from which sound arrived at the microphone array (called sound source localization). However, videoconferencing devices also have one or more loudspeakers for playing sound received from the far-end. While the incoming far-end sound signal can be used to detect and cancel some of the far-end sound captured by the near-end microphone array, this echo cancellation is imperfect and the audio data captured by the near-end microphone may include significant levels of sound from the far-end (as played on the near-end loudspeakers). This leakage can cause a number of problems observed only by the present inventors. For example, it can make the sound source localization return false positives, which can cause automatic panning and zooming to pan/zoom to an inactive speaker or worse. The sound source localization may become unavailable. The leakage of course can also create audible echo at the far-end.

Techniques discussed below relate to dealing with far-end sound in teleconferencing devices.

SUMMARY

The following summary is included only to introduce some concepts discussed in the Detailed Description below. This summary is not comprehensive and is not intended to delineate the scope of the claimed subject matter, which is set forth by the claims presented at the end.

Frames containing audio data may be received, the audio data having been derived from a microphone array, at least some of the frames containing residual acoustic echo after having acoustic echo partially removed therefrom. Probability distribution functions are determined from the frames of audio data. A probability distribution function comprises likelihoods that respective directions are directions of sources of sounds. An active speaker may be identified in frames of video data based on the video data and based on audio information derived from the audio data, where use of the audio information as a basis for identifying the active speaker is controlled by determining whether the probability distribution functions indicate that corresponding audio data includes residual acoustic echo.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to dealing with far-end sound, or effects thereof, in a teleconferencing system. Three embodiments are discussed, including an embodiment relating to determining when sound source localization for a microphone array may be detecting a loudspeaker and controlling use of sound source localization accordingly. Another embodiment involves selectively omitting various bands of far-end frequency from audio data received from a microphone array before performing sound source localization thereon. Yet another embodiment relates to subband-based voice switching, namely, removing portions of far-end sound data that are in frequency bands where near-end speech is occurring.

Identifying Predomination of Far-End Sound

Figure 1:
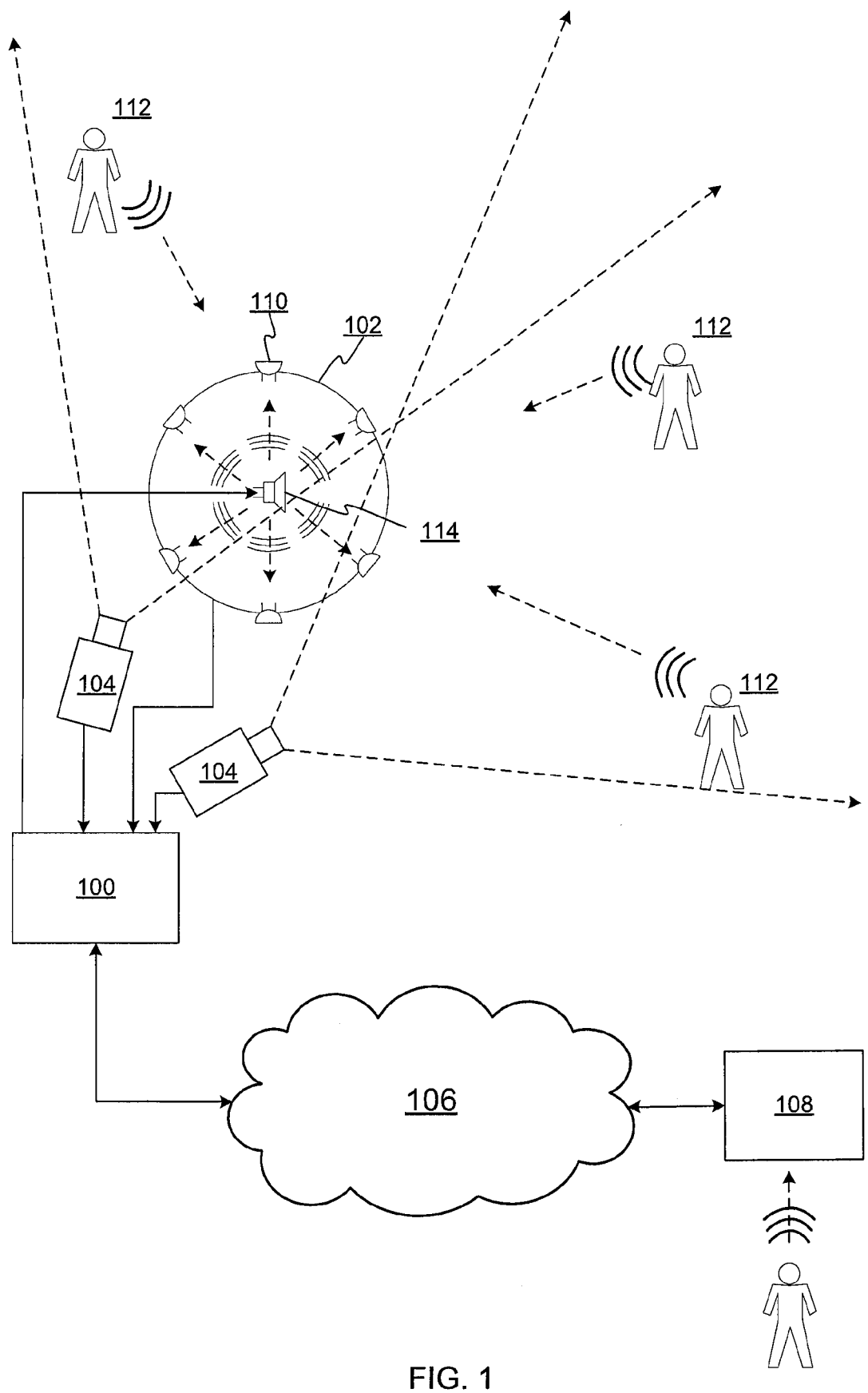
FIG. 1 shows a near-end teleconference device with a microphone array and video cameras.

FIG. 1 shows a near-end teleconference device 100 with a microphone array 102 and video cameras 104. The near-end teleconference device 100 is configured to communicate over a network 106 and exchange audio and/or video signal data with a far-end device 108. The network 106 can be a data network, a switched circuit network (e.g. POTS), or a combination thereof. The far-end device 108 need not have video capabilities, and for some embodiments discussed herein the near-end teleconference device 100 also may not have video capabilities.

The example microphone array 102 in FIG. 1 has multiple microphones 110 arranged in a circle. The microphones 110 may be omnidirectional or directional. The 6-microphone circular microphone array 102 is only an example. Any number of microphones in a variety of arrangements can be used. In some embodiments the teleconference device 100 may have one or more video cameras 104. If multiple cameras 104 are used, their images may be stitched together to form a single virtual image. The microphone array 102 and the video cameras 104 capture audio (e.g., speech) and video signals of nearby persons 112. In one embodiment, the video cameras 104 are co-located with or part of the device 100.

The teleconference device 100 is also equipped with a loudspeaker 114, possibly many, which may be any of a variety of known devices that can generate sound from a signal. In one embodiment the loudspeaker 114 is at the center of the microphone array 102. The teleconference device 100 receives a sound signal from the far-end device 108 and the loudspeaker 114 generates sound therefrom.

The near-end teleconference device 100 may have a processor, preferably a digital signal processor (DSP), to process the incoming and outgoing audio and video signals. The processor may perform a variety of tasks such as synthesizing the signals from the various microphones 110, performing image-processing algorithms on the video signals, performing speaker-recognition algorithms on incoming video data, performing sound-source localization on audio data from the microphone array 102, cancelling acoustic echo from the sound signal captured by the microphone array 102, among others.

Figure 2:
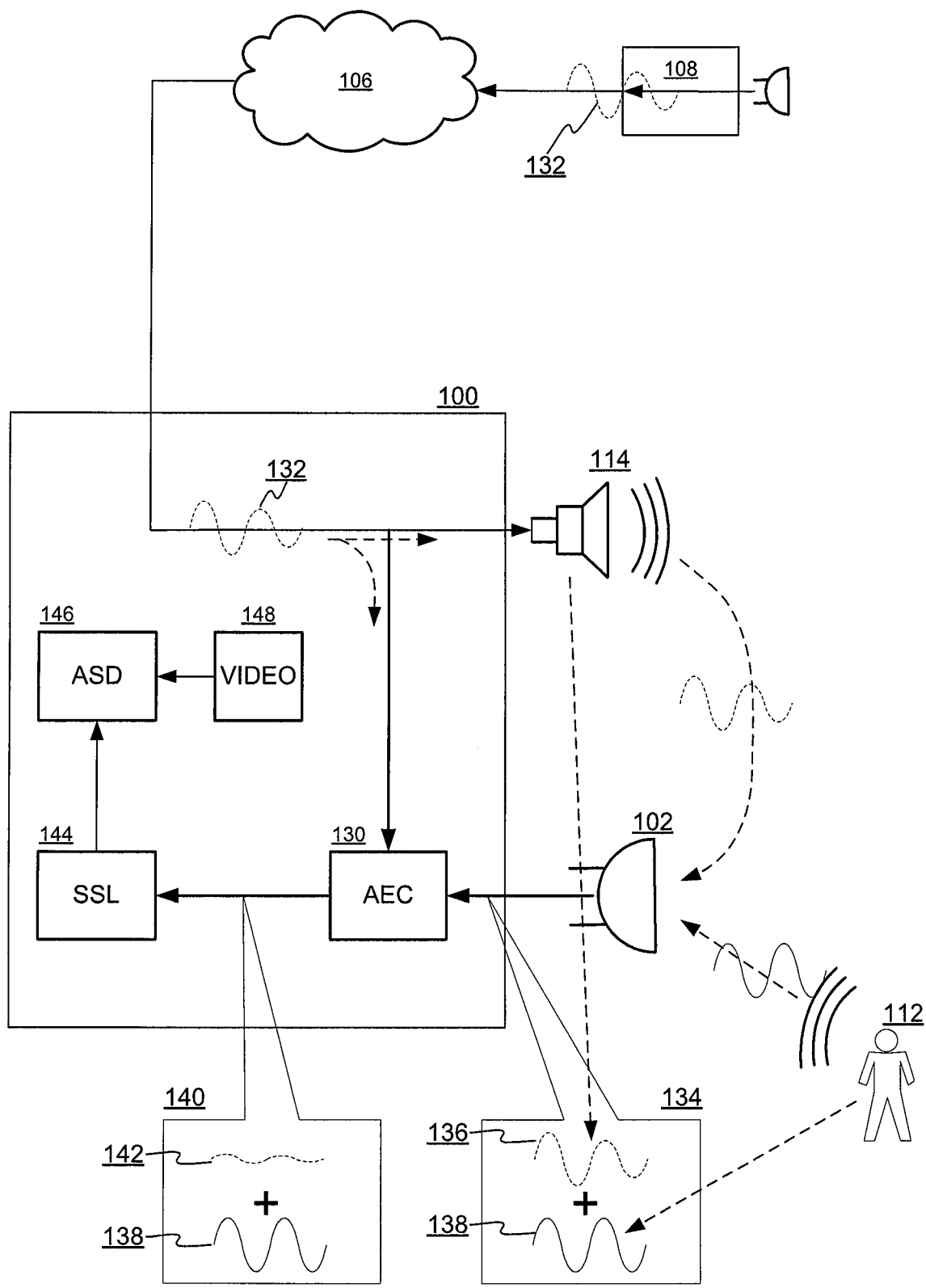
FIG. 2 shows an arrangement of logical functions of a teleconference device.

FIG. 2 shows an arrangement of logical functions of teleconference device 100. As mentioned above, it may be desirable for the teleconference device 100 to be able to play sound from a far-end device 108 and also identify an active speaker among nearby persons 112 using locally captured audio and/or video data. Accordingly, the teleconference device 100 has various modules including an acoustic echo cancellation (AEC) module 130.

The AEC module 130 may be a process running on a DSP or CPU. The microphone array 102 (for illustration, shown only as a single loudspeaker) receives far-end sound from the loudspeaker 114 (playing far-end sound) and near-end sound from one or more nearby persons 112 speaking. Frames of audio data 134 generated from the captured signals of the microphone array 102 therefore contain far-end sound data 136 and near-end sound data 138. Using any of a variety of known echo-cancellation algorithms, the AEC module 130 uses the audio signal 132 received from the far-end device 108 to attenuate the far-end sound data 136, thus outputting frames of echo-cancelled audio data 140 with an attenuated far-end component 142. Note that most acoustic echo cancellation algorithms are imperfect and will have some leakage of far-end audio data.

The teleconference device 100 is also, in some embodiments, provided with a sound-source localization (SSL) module 144. The SSL module 144 receives the frames of echo-cancelled audio data 140 and attempts to determine likely directions of sound therefrom. The general approach used with most microphone arrays is based on time-difference-of-arrival (TDOA), the difference in arrival times of sound over different microphones, which is computed to gauge the likely direction that sound came from. In one embodiment, the SSL module 144 uses the frames of echo-cancelled audio data 140 to compute probability distribution functions (PDFs). A PDF consists of probabilities (or likelihoods), over an angular range which in this example is 360 degrees, but which may be less. Each probability corresponds to a portion of the angular range and the probability for such a portion represents the calculated likelihood that the sound originated from that direction, relative to the microphone array 102. For example, a PDF may have 90 probabilities, corresponding to 4 degree increments spanning 360 degrees (see FIG. 3). Other techniques for sound localization may be used, such as beamforming or other techniques mentioned in U.S. patent application Ser. No. 10/446,924, titled "A System and Process for Robust Sound Source Localization". Further details of sound source localization are available elsewhere.

The teleconference device 100, to provide features such as automatic panning/zooming to active speakers, tracing who said what and when, etc., may include other components such as an active speaker detector (ASD) 146. The ASD 146 may use audio data (e.g., in the form of a PDF from SSL 144) and/or video input from a video processing system 148 which generates video data from the signals of video cameras 104. This data is used to find an active speaker. Active speaker detection algorithms are known and details thereof are available elsewhere.

Typical state of the art echo-cancellation algorithms may remove 20-30 dB of far-end sound, leaving some residual echo in the audio data being generated by the teleconference device 100. That audio, including echo, is sent to the remote device 108 and it may also be used for sound source localization, as discussed further below. For details on how ASD 146 operates, see U.S. patent publication/application Ser. No. 11/425,967, titled "Identification Of People Using Multiple Types Of Input".

As seen in FIG. 2, the ASD 146 receives sound localization information such as PDFs from the SSL 144. The ASD 146 may use this sound localization information to help identify an active speaker. However, the leaked far-end sound component 142 received by the SSL 144 can influence the output of the SSL 144. When the far-end component 142 predominates over near-end sound data 138, the SSL 144 can falsely point to the loudspeaker 114 as the source of sound (see pattern in FIG. 3). This can affect the ASD 146, causing it to fail to identify the active speaker or identify as active a person who is not.

Figure 3:
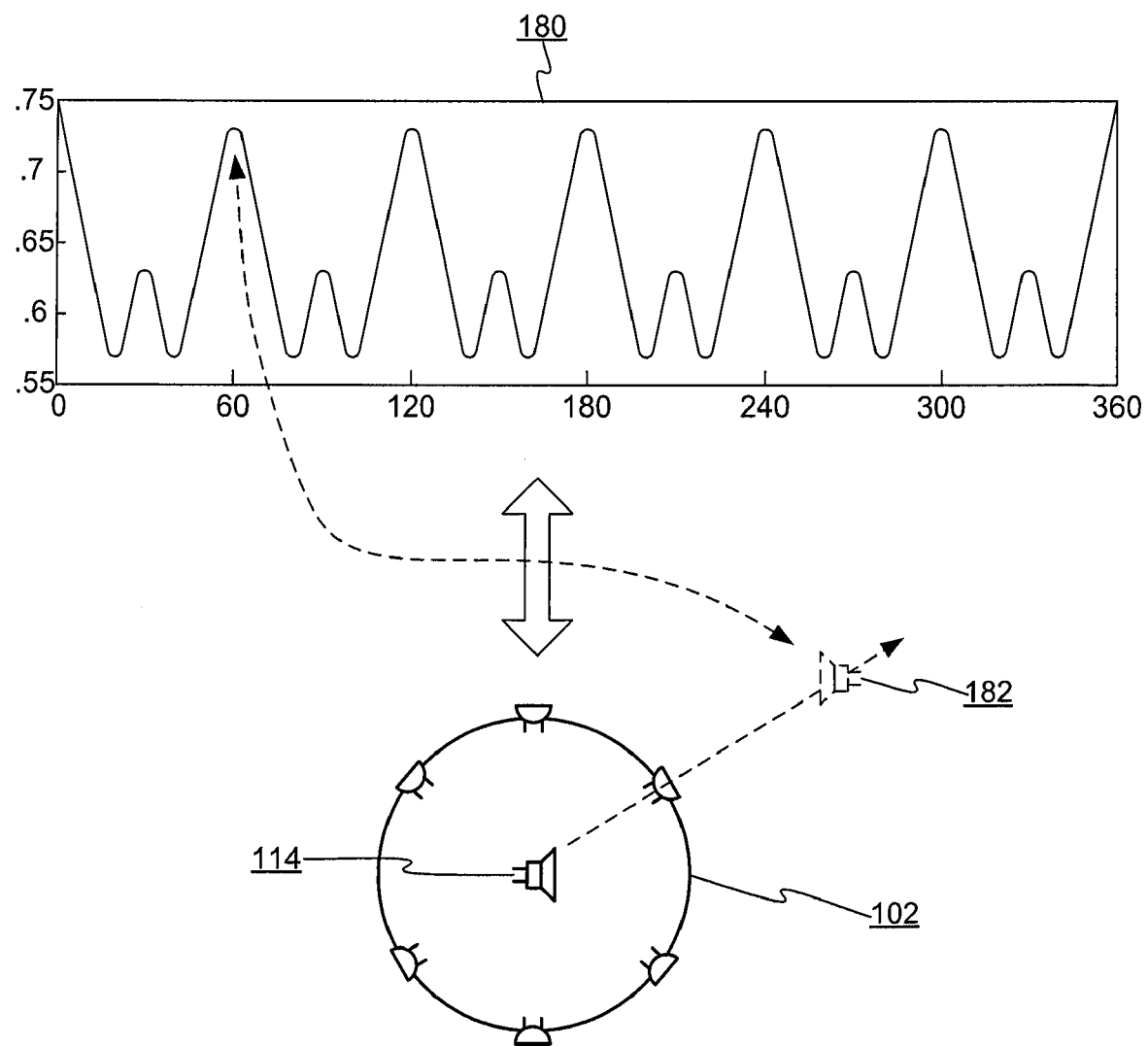
FIG. 3 shows a probability distribution function (PDF) of a circular microphone array with 6 microphones.

FIG. 3 shows a PDF 180 of a circular microphone array 102 with 6 microphones. The horizontal axis is a span of directions from 0 to 360 degrees, around the microphone array 102. The vertical axis is the likelihood or probability that sound originated at a direction of a corresponding direction on the horizontal axis. The PDF 180 is an example of what might be generated by SSL 144 when the microphone array 102 is receiving sound mostly from the loudspeaker 114. As discussed later, other microphone array arrangements might have other PDFs that indicate that sound is mostly coming from one or more loudspeakers. Looking to PDF 180, there are 6 peaks (or local maximums), which may arise as an artifact of the SSL 144's localization algorithms and due to the symmetry of the array-loudspeaker arrangement. Because the SSL 144 expects sounds to originate from outside the microphone array 102, it computes incoming audio data as though the loudspeaker 114 were directly opposite each microphone 110. In other words, the peaks of PDF 180 correspond to directions of six "shadow" sound sources 182 (mirrors of the loudspeaker 114); the six shadow sources being on respective rays projected from the loudspeaker 114 (through the respective microphones 110) but outside the circular microphone array 102.

While the curvature and peaks of the PDF 180 might be specific to a circular array with a central loudspeaker (and even perhaps specific to the sound source localization algorithm selected for use in the SSL 144), the general observation made by the inventors is that there may be a unique PDF that corresponds to, and indicates, a microphone array receiving sound primarily from one or more stationary loudspeakers (or loudspeaker(s) with a known location(s)). While other array and loudspeaker configurations may have different PDFs (see FIG. 4), the general observation that an array-loudspeaker arrangement has a PDF that indicates that loudspeaker sound is predominant can be used to improve performance of the ASD 146. This will be discussed later with reference to FIG. 5.

Figure 4:
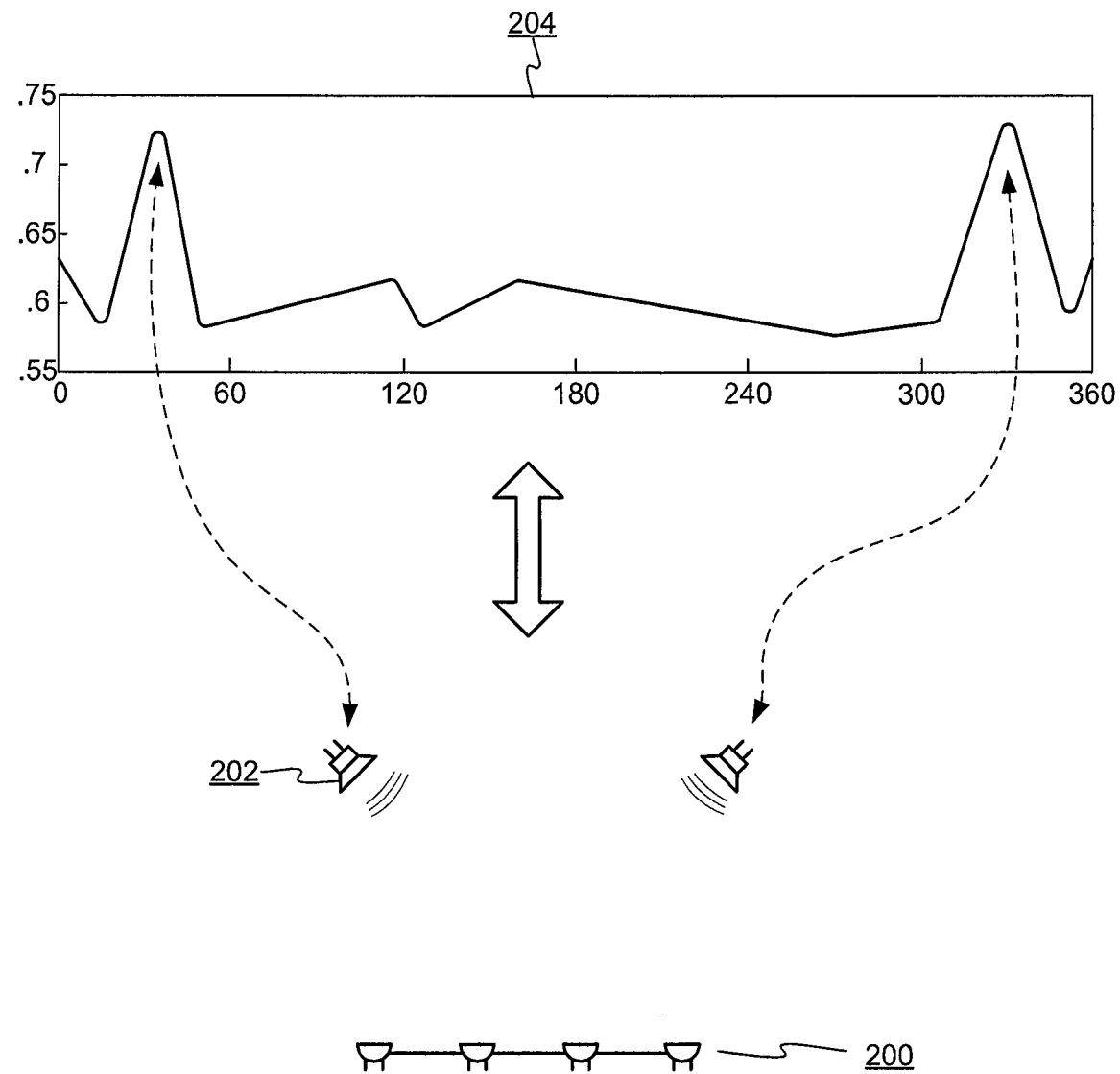
FIG. 4 shows a linear microphone array with two loudspeakers.

FIG. 4 shows a linear microphone array 200 with two loudspeakers 202. The arrangement of FIG. 4 might have a PDF like PDF 204. The peaks of PDF 204 correspond to the directions of the loudspeakers 202 from the microphone array 200. In this simple configuration, as sound from the loudspeakers 202 increases relative to other local sound or noise (if any) PDFs can be expected to become increasingly similar to PDF 204.

Figure 5:
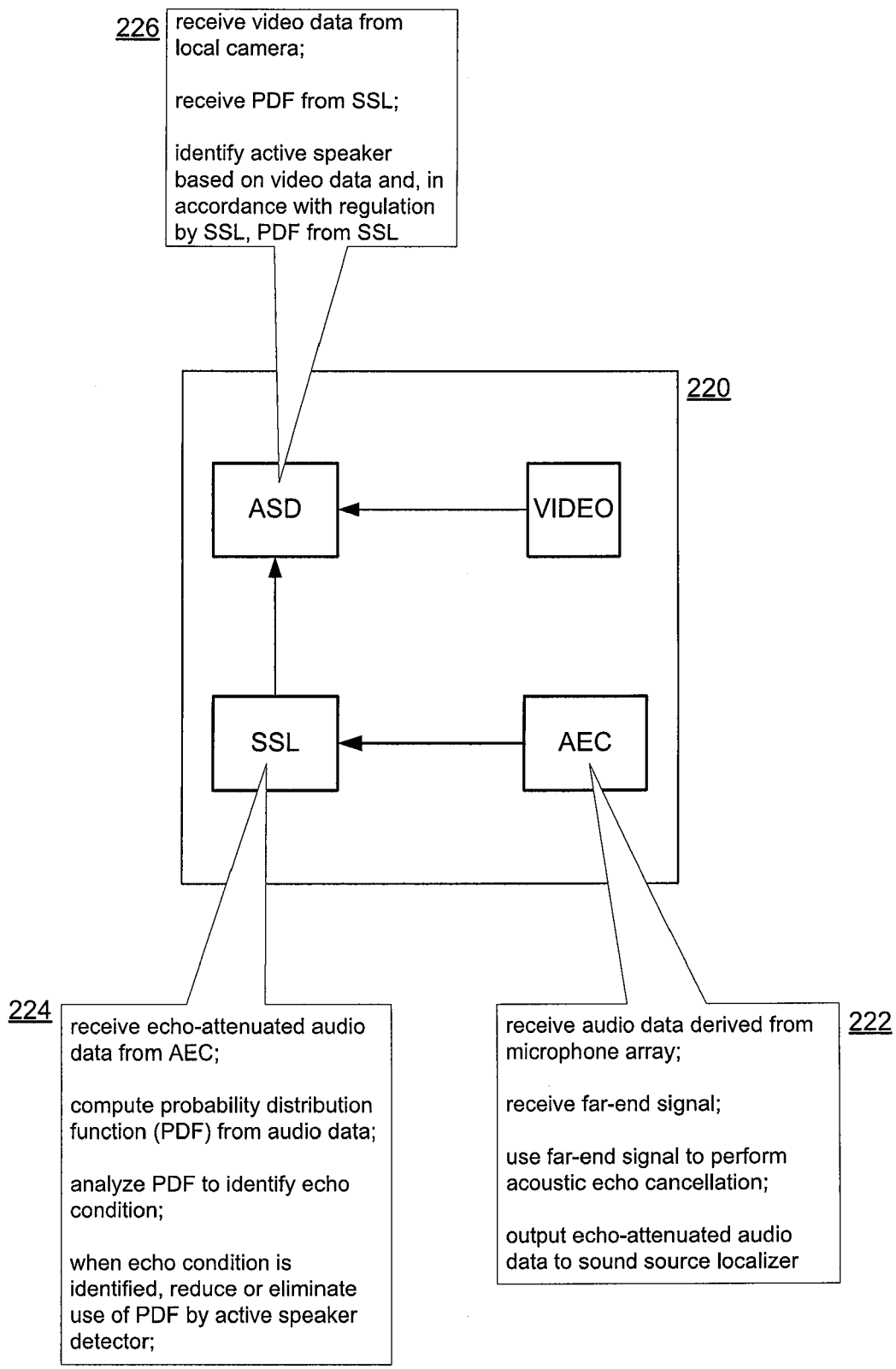
FIG. 5 shows processes for improving active speaker detection for a teleconference device.

FIG. 5 shows processes for improving active speaker detection for a teleconference device 220. An AEC performs a process 222. Process 222 includes receiving near-end audio data derived from a microphone array, typically in the form of frames or timeslices of audio data. The AEC receives far-end audio data, also in the form of frames of audio data. The frames of far-end audio data and near-end audio data are coupled or synchronized in time, such that a frame of near-end audio was captured when a corresponding frame of far-end audio data was played by a near-end loudspeaker. The far-end signal or audio data is used to perform acoustic echo cancellation, which attenuates some, but not all, of the audio data attributable to the loudspeaker. This echo-attenuated audio data is then output to the SSL. The SSL performs a process 224, including receiving the echo-attenuated audio data from the AEC. The SSL computes a PDF from the audio data (as it would for any audio data under the assumption that local sound needs to be localized). The SSL analyzes the PDF to identify an echo condition. In other words, the SSL looks at properties of the PDF to determine whether the microphone array is actually receiving sound mostly from the loudspeaker. In that case, the SSL reduces or eliminates use of the PDF by the active speaker detector (ASD). This may be accomplished in a variety of ways. The SSL may signal the ASD to ignore the SSL's output. The SSL may simply not output a PDF or may output an empty PDF. It should also be noted that the analyzing of the PDF need not occur at the SSL itself. The ASD as well could be configured to analyze incoming PDFs and identify an echo-predominant condition. Assuming that the SSL performs the analysis, the ASD may perform a process 226 of receiving video data derived from one or more local video cameras, receiving a PDF from the SSL, and identifying an active speaker based on the video data and, in accordance with information from the SSL, possibly based also on the PDF. By omitting sound source localization information when sound appears to originate primarily from one or more loudspeakers, false speaker detections can be avoided at the ASD.

In other embodiments, it may be desirable to raise or lower the weight of a PDF (as used in the ASD) based on how similar the PDF is to the echo-predominant PDF pattern. The less similar a PDF is to an echo-predominant PDF pattern, the less weight it is given when used in conjunction with video data to identify an active speaker. While FIG. 6 shows a detailed example of how a PDF might be analyzed, there are benefits of generally regulating or controlling the use of sound source localizer by analyzing the localization information produced thereby.

Figure 6:
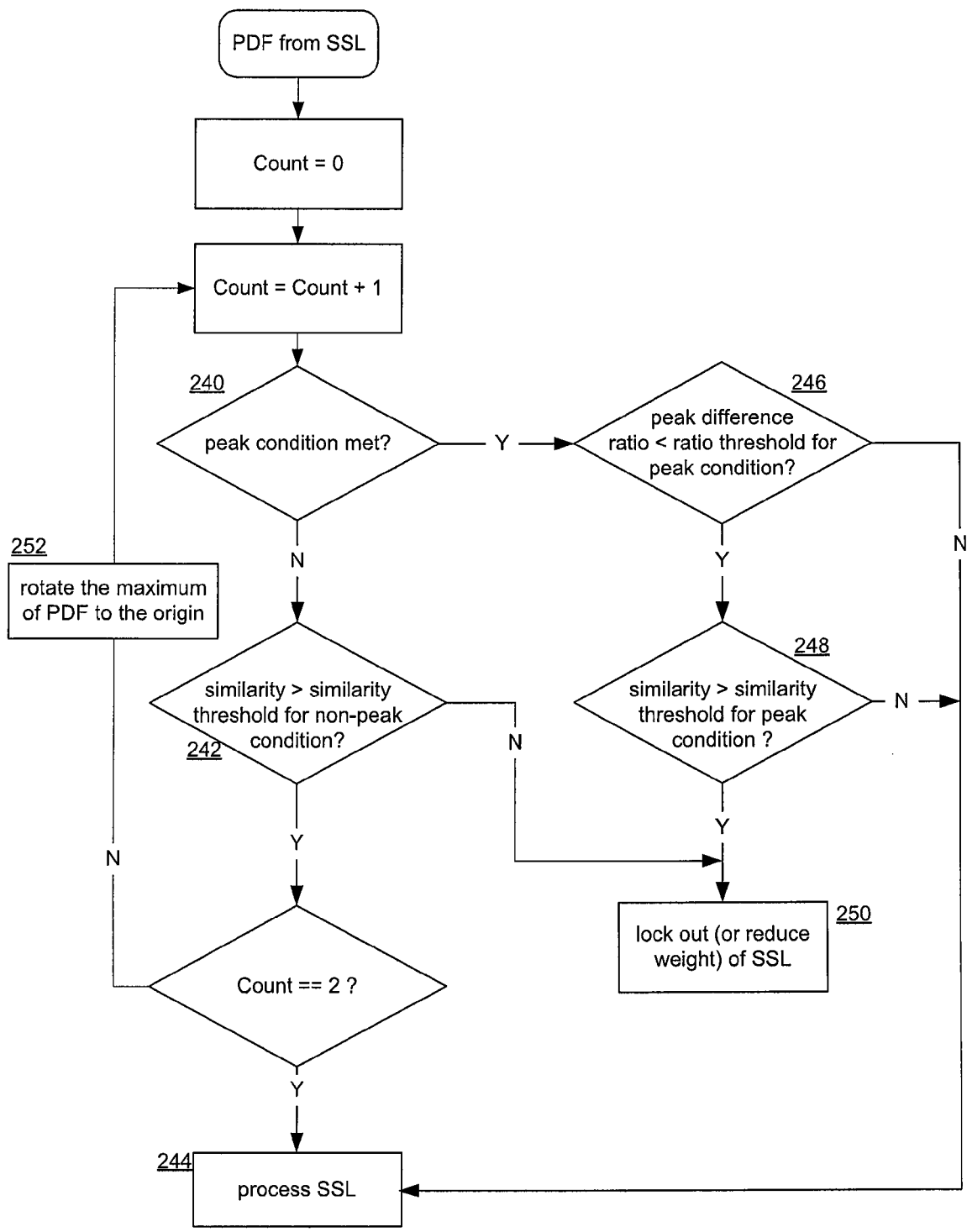
FIG. 6 shows a detailed example process of analyzing a PDF to determine whether to lock out or attenuate sound source localization output in an active speaker detection process.

FIG. 6 shows a detailed example process of analyzing a PDF to determine whether to lock out or attenuate sound source localization output in an active speaker detection process. First a PDF from the SSL is received and it is determined if 240 a peak condition is met where expected. This may involve determining whether the PDF has peaks at or near where they are expected. Referring to the example of FIG. 3, this would involve looking for peaks at 0/360 degrees, 60 degrees, 120, degrees, etc. If 240 the peak condition is not met, there is a check to determine if 242 the similarity of the PDF is greater than a similarity threshold for a non-peak condition. The similarity is how similar a subsection (or an average or mean thereof) of the PDF is to what is expected in an echo-predominant condition. That is, even if 240 the peak condition is not met, it might turn out that the PDF being analyzed has another property such as symmetry that is similar to the echo-predominant PDF. If 242 the similarity is insufficient then the SSL's output, the PDF, is processed 244 by the ASD. If 240 the peak condition is met, then another test is performed. A peak difference ratio is calculated (the difference between the lowest and highest peak, divided by the lowest peak). If 246 the ratio is lower than a threshold condition then the PDF is processed 244. However, if 246 the ratio is higher than the threshold condition the similarity is checked against another threshold. If 248 this threshold is exceeded, then the SSL and/or the PDF is attenuated or locked out, otherwise it is processes 244. Note that if the PDF passes and a decision is made to process the SSL, then the following may also be performed: find the location of the maximum peak of PDF; rotate 252 the PDF and make the maximum peak at the zero degrees point (origin); and repeat steps 240-252.

Again, it should be appreciated that there are many characteristics of a PDF that can be analyzed, any combination of which might be deemed to be sufficient to lockout the SSL. Furthermore, the characteristics will be highly dependent on the exact hardware and arrangement being used. The thresholds will also be dependent on implementation details. The best way to determine characteristics and thresholds is to experiment until the SSL is consistently locked out from the SSL when far-end sound predominates and false identifications are minimized. Furthermore, regardless of the properties or characteristics of a PDF that are examined, a net effect may be that the contribution of sound source localization information to speaker detection will vary as sound received by the microphone array varies; when the microphone array receives much more sound from the loudspeaker than from local persons talking (even after echo cancellation), the contribution of the acoustic active speaker detection process will be reduced or eliminated.

Figure 7:
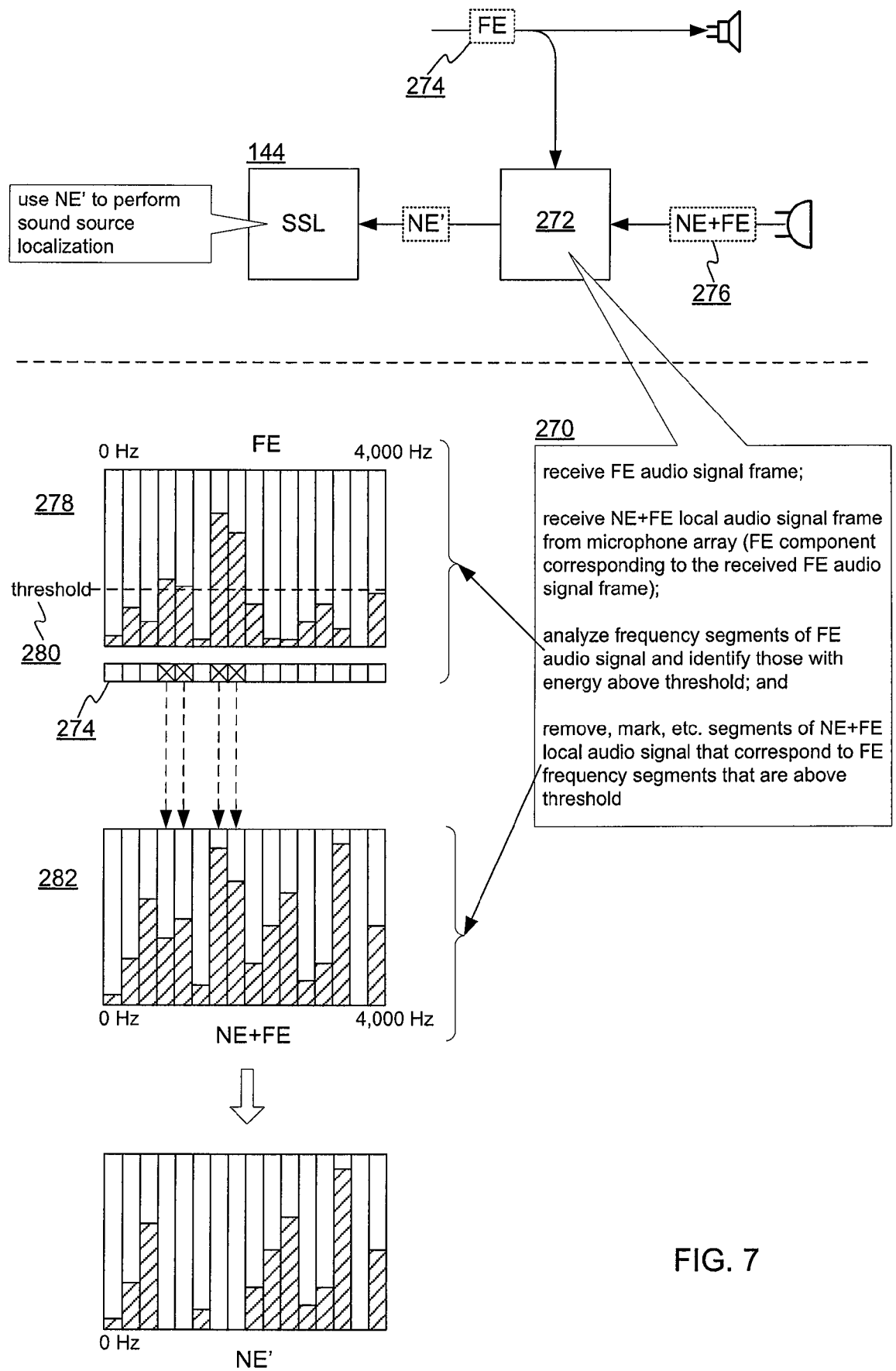
FIG. 7 shows a process for reducing far-end sound data being received by a sound source localizer (SSL).

Selectively Deleting/Ignoring Bands of Far-End Frequency from Audio Data Received from a Microphone Array FIG. 7 shows a process 270 for reducing far-end sound data being received by SSL 144. In this embodiment, a filter 272 selectively filters out frequency bands of far-end sound data before they are processed by the SSL 144. The filter 272 receives a far-end (FE) audio signal frame 274 (having been sent by a far-end teleconference device and also played on the loudspeaker). The filter also receives a near-end audio signal frame 276 ("NE+FE") which contains both original near-end sound data (e.g., voice of persons) and far-end sound data, the far-end sound data resulting from playing of the far-end audio signal frame 274 on the loudspeaker. The frames 274 and 276 are assumed to be coupled or synchronized so that the near-end audio signal frame 276 can be analyzed using the far-end audio signal frame 274.

Having received frames 274 and 276, the filter 272 analyzes frequency segments of far-end audio signal data from frame 274. For example, if the far-end audio signal data spans a frequency range of 0 to 4,000 Hz (may vary per implementation, sampling rate, etc.), the filter 272 might divide the far-end audio signal data into 40 Hz subbands (totaling 100). Spectrogram 278 shows frequency subbands and their energy levels, corresponding to intensity or loudness of far-end sound. Any subbands which have energy above a threshold 280 are marked, for example in a bit vector 282. Process 270 then proceeds to cause corresponding frequency subbands of the audio signal data from the near-end audio signal frame 276 to not be processed by the SSL 144; the frequency subbands are not used in the sound source localization algorithms used by the SSL 144.

Any number of mechanisms can be used to mark or remove frequency subbands from the near-end audio signal data. For example, the bit vector 274 can be passed to the SSL 144 which can use it to ignore marked frequency subbands. The frequency subbands of the near-end audio signal data can simply be zeroed-out in place before being passed to the SSL 144. Regardless of the mechanism used, the near-end audio signal data should be divided into frequency subbands as seen in spectrogram 282.

Threshold 280 is not necessary but can be helpful to minimize the effect of background or system noise. The threshold 280 can be computed on the fly based on average noise level or it can be pre-determined by empirical testing. Different thresholds may be used for different subbands or ranges of subbands. Furthermore, the entire range of frequency (e.g., 0 to 4,000 Hz) need not be subjected to process 270, as it may be the case that only certain ranges of frequency regularly experience overlap of near-end and far-end sound.

Because far-end sound is removed from the audio data provided by the microphone array, most if not all loudspeaker sound is removed from the near-end audio data. The effect is that sound source localization becomes more accurate because it is much less likely to identify the loudspeaker as a sound source. This technique of removing subbands of far-end sound data is useful in an audio-only teleconference system. However, if the SSL 144 is used to supplement an active speaker detection process, then the accuracy will be improved. Finally, it should be noted that the general idea of filtering near-end subbands that have corresponding far-end subbands with energy is beneficial beyond improving sound source localization. For example, the technique can be used to reduce audio echo that the far-end receives. The process 270 is lightweight and can be implemented in almost any stage of an audio system. For example, process 270 could be implemented at a stage where acoustic echo cancellation is performed, or before echo cancellation, or can be integrated with SSL 144.

Subband Voice-Switching

Figure 8:
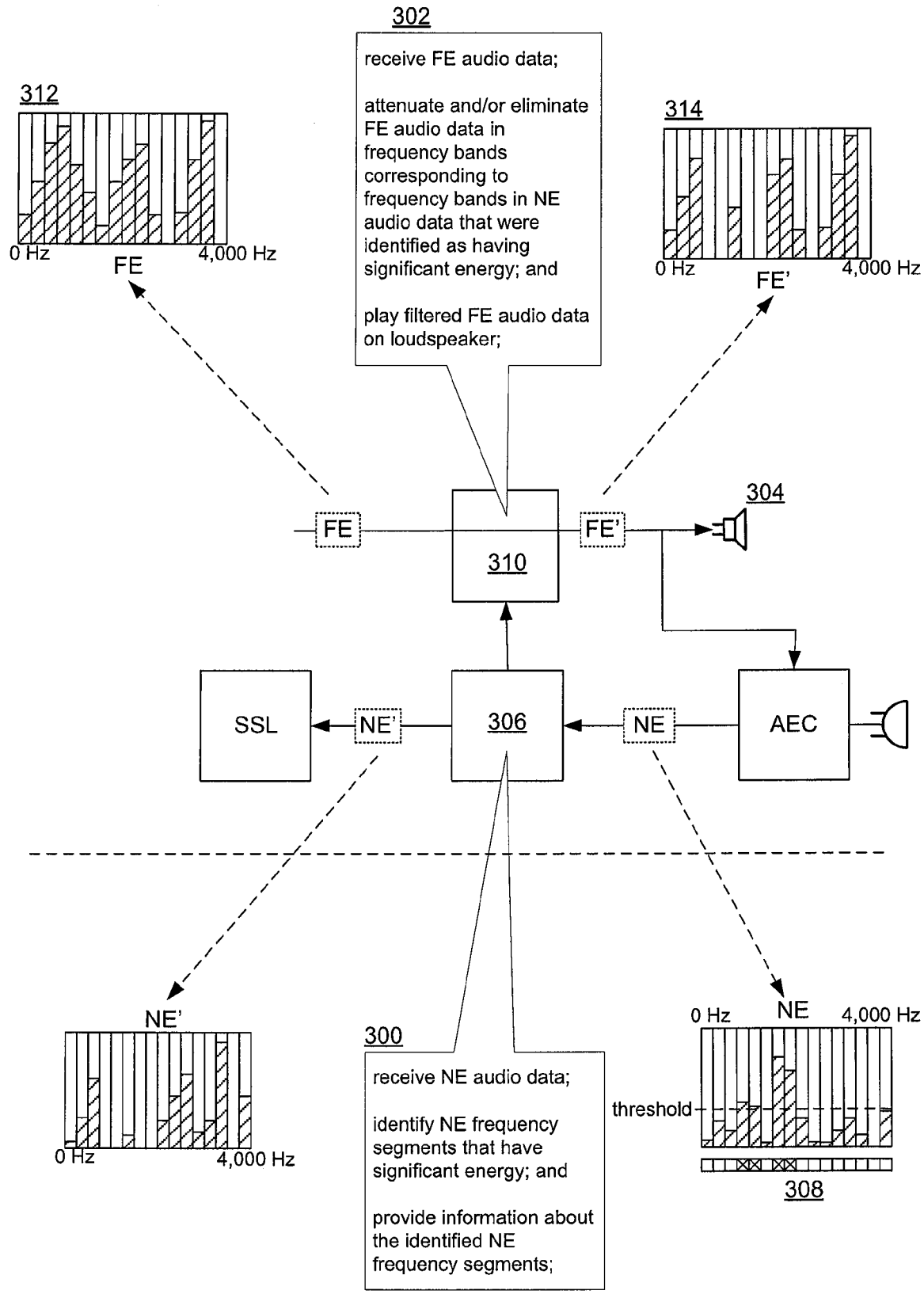
FIG. 8 shows processes for performing subband based voice-switching.

FIG. 8 shows processes 300, 302 for performing subband based voice-switching. Voice-switching is a known technique by which a near-end and far-end alternate between which is transmitting and which is playing back the transmitted data. This prevents acoustic echo but also can create lock-out and creates somewhat artificial conversation between participants. Subband based voice-switching involves attenuating subbands of far-end sound before they are played on a local loudspeaker 304.

A subband analyzer 306 performs process 300, which involves receiving near-end audio data that is relatively clear of far-end audio data. That is, there is little or no acoustic echo present. This might be done using a satellite microphone that is not near the loudspeaker 304. Another approach is to analyze near-end sound at periods of far-end silence (as indicated by lack of audio signal being received from the far-end). Yet another technique is to use statistical models of speech to perform line source separation.

The near-end audio data is segmented into frequency subbands as shown in spectrogram 308. Any subbands that have energy above a threshold are identified, for example by setting bits in a bit vector. Information about the identified near-end frequency segments is provided to an audio component 310. The audio component 310 performs process 302, which involves receiving far-end audio data and segmenting it into frequency subbands (see spectrogram 312) of far-end audio data. Before the far-end audio is played, the portions that correspond to identified near-end frequency subbands (per process 300) are attenuated or removed (see spectrogram 314). The filtered far-end audio data is then played on the loudspeaker 304. The microphone (not necessarily an array) receives near-end sound which includes the filtered far-end sound played on the loudspeaker 304. Because the near-end audio data received from the microphone has subbands with contain either far-end sound or near-end sound, but not both, far-end sound can be readily filtered, reducing echo at the far-end and improving sound source localization if it is to be used.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile or working memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on. Peripheral devices such as cameras, loudspeakers, and microphone arrays can be connected with the computing device.

The invention claimed is:

1. One or more volatile and/or non-volatile physical computer readable media storing information to enable one or more devices to perform a process, the process comprising:
receiving frames containing audio data, the audio data having been derived from a microphone array, at least some of the frames containing residual acoustic echo after having acoustic echo partially removed therefrom;
determining, from the frames of audio data, probability distribution functions, a probability distribution function comprising likelihoods that respective directions are directions of sources of sounds; and
identifying an active speaker in frames of video data based on the video data and based on audio information derived from the audio data, where use of the audio information as a basis for identifying the active speaker is controlled by determining whether the probability distribution functions indicate that corresponding audio data includes residual acoustic echo.

2. One or more volatile and/or non-volatile physical computer readable media storing information to enable one or more devices to perform a process according to claim 1, wherein the determining whether the probability distribution functions indicate that corresponding audio data includes residual acoustic echo comprises: identifying a plurality of local maximums of a probability distribution function.

3. One or more volatile and/or non-volatile physical computer readable media storing information to enable one or more devices to perform a process according to claim 2, the process further comprising determining whether the local maximums are substantially at pre-determined locations in the probability distribution functions.

4. One or more volatile and/or non-volatile physical computer readable media storing information to enable one or more devices to perform a process according to claim 3, the process further comprising finding a difference between a maximal local maximum and a minimal local maximum of the probability distribution function.

5. One or more volatile and/or non-volatile physical computer readable media storing information to enable one or more devices to perform a process according to claim 2, the process further comprising determining whether the identified local maximums are similar to local maximums that occur when substantially all of the sound being received by the microphone array is sound from a loudspeaker.

6. One or more volatile and/or non-volatile physical computer readable media storing information to enable one or more devices to perform a process according to claim 1, wherein the determining whether the probability distribution functions indicate that corresponding audio data includes residual acoustic echo comprises: determining whether characteristics of a probability distribution function are sufficiently similar to predetermined characteristics.

7. One or more volatile and/or non-volatile physical computer readable media storing information to enable one or more devices to perform a process according to claim 6, wherein the predetermined characteristics comprise characteristics of a probability distribution function that would occur if the microphone array was receiving sound predominantly from the loudspeaker.

8. One or more volatile and/or non-volatile physical computer readable media storing information to enable one or more devices to perform a process according to claim 1, wherein the determining whether the probability distribution functions indicate that corresponding audio data includes residual acoustic echo comprises: determining whether the probability distribution functions have local maximums near predetermined directions.

9. A method performed by one or more devices that comprise one or more processors and storage, the method comprising:
   receiving, in the storage, frames containing audio data, the audio data having been derived from a microphone array, at least some of the frames containing residual acoustic echo after having acoustic echo partially removed therefrom;
   determining by the one or more processors, from the frames of audio data, probability distribution functions, a probability distribution function comprising likelihoods that respective directions are directions of sources of sounds, and storing the probability distribution functions in the storage; and
   identifying, by the one or more processors, an active speaker in frames of video data in the storage based on the video data and based on audio information derived from the audio data by the one or more processors, where use of the audio information as a basis for identifying the active speaker is controlled by the one or more processors determining whether the probability distribution functions indicate that corresponding audio data includes residual acoustic echo.

10. A method according to claim 9, further comprising determining whether characteristics of the probability distribution functions are similar to characteristics of a probability distribution function that corresponds to the microphone array primarily receiving sound from a loudspeaker.

11. A method according to claim 10, further comprising:
   receiving frames of audio data from a far-end source and using the frames to produce sound with a loudspeaker co-located with the microphone array, where the sound received at the microphone includes the sound produced with the loudspeaker;
   generating audio frames from the sound received at the microphone array, performing echo cancellation on the audio frames, wherein the probability distribution functions are computed from the audio frames after the echo cancellation; and
   allowing a probability distribution function to be used in the active speaker detection process when characteristics of the probability distribution function are determined to be not similar to characteristics of a probability distribution function that corresponds to the microphone array primarily receiving sound from a loudspeaker.

12. A method according to claim 9, further comprising identifying and analyzing local maximums of the probability distribution functions.

13. A method according to claim 12, wherein the analyzing the local maximums comprises comparing them to direction(s) of one or more loudspeakers.

14. A method according to claim 13, wherein the analyzing further comprises identifying a maximal local maximum and a minimal local maximum.

15. A method according to claim 14, further comprising subtracting the magnitude of the minimal local maximum from the magnitude of a maximal local maximum and dividing by the magnitude of the minimal local maximum.

16. A method according to claim 15, further comprising subtracting the magnitude of the minimal local maximum from the magnitude of a maximal local maximum and dividing by the magnitude of the minimal local maximum.

17. A method according to claim 9, further comprising analyzing the probability distribution functions to determine whether the probability functions are to be used to detect an active speaker.

* * * * *